United States Patent [19]

Gjessing et al.

[11] Patent Number: 4,843,597
[45] Date of Patent: Jun. 27, 1989

[54] SYSTEM FOR MARINE SEISMIC EXPLORATION

[76] Inventors: Dag K. T. Gjessing, Skogfaret 54, 2020 Skedsmokorset, Norway; Jens F. Hjelmstad, Hurdalsgt. 41A, 2000 Lillestrøm, Norway; Andreas Tonning, Steinhaugen 20, 7000 Trondheim, Norway

[21] Appl. No.: 102,200
[22] PCT Filed: Jan. 12, 1987
[86] PCT No.: PCT/NO87/00004
  § 371 Date: Oct. 2, 1987
  § 102(e) Date: Oct. 2, 1987
[87] PCT Pub. No.: WO87/04258
  PCT Pub. Date: Jul. 16, 1987

[30] Foreign Application Priority Data

Jan. 13, 1986 [NO] Norway ............................ 860093

[51] Int. Cl.⁴ .............................................. G01V 1/38
[52] U.S. Cl. .......................................... 367/15; 367/87; 342/22
[58] Field of Search ............... 342/22, 52; 367/87, 367/94, 100, 128, 14, 15, 21

[56] References Cited

U.S. PATENT DOCUMENTS 4,146,870  3/1979  Ruehle .................................. 367/20
4,583,095  4/1986  Peterson ............................... 342/22

FOREIGN PATENT DOCUMENTS

821289    4/1982  Norway .
146924    9/1982  Norway .
149365    4/1984  Norway .
2063003A  5/1981  United Kingdom .

Primary Examiner—Thomas H. Tarcza
Assistant Examiner—Ian J. Lobo
Attorney, Agent, or Firm—Wenderoth, Lind & Ponack

[57] ABSTRACT

System for seismic profiling of structures (2) beneath the sea bottom, comprising an acoustic transducer array (12) which synchronously and coherently generates an acoustic wave adapted to be reflected from said structures (2). When the reflected acoustic waves propagate towards the water surface (1), there is caused a perturbation of the electromagnetic reflection coefficient thereof. Receiver means for detection and characterization of the received acoustic field at the surface (1), comprises a radar system (10) illuminating the region concerned of the surface (1) and imposes thereat a number of interferograms each corresponding to the acoustic field from a scattering point given by the position thereof and the frequency of the field. By recording the degree of coincidence between the interferograms and the acoustic perturbation pattern on the water surface (1), the seismic properties of said structures (2) are surveyed.

15 Claims, 11 Drawing Sheets

TIME DOMAIN

FIG. 9A

- SPATIAL RESOLUTION
  $\Delta z = c\tau$

- NOISE BANDWIDTH
  $\Delta F_{NOISE} = \frac{1}{c\tau}$

- PEAK POWER = $(V_{MAX})^2$

FREQUENCY DOMAIN

FIG. 9B

- SPATIAL RESOLUTION
  $\Delta z = \frac{c}{\Delta F}$

- NOISE BANDWIDTH
  $\Delta F_{NOISE} = M \delta F$

- PEAK POWER $\approx (\frac{V_{MAX}}{M})^2$

$$\Delta K = \frac{2\pi}{L} = \frac{1}{C}\left[(\omega \frac{d}{R})^2 + \Delta\omega^2\right]^{1/2}$$

$$\theta = \tan^{-1}\left(\frac{\omega d}{\Delta \omega R}\right) \quad \text{EXAMPLE}$$

R = 10 km   $\Delta f$ = 2 MHz
f = 6 GHz   d = 55 cm   $\theta = 45°$

SYSTEM FOR MARINE SEISMIC EXPLORATION

BACKGROUND OF THE INVENTION

Known methods for marinre seismic exploration are based on the emission of acoustic waves in the water from acoustic sources in the form of explosive charges, air guns and the like, whereby the corresponding acoustic signals from the depth are received by means of hydrophones, usually arranged ina seismic streamer which is towed behind a vessel.

This invention provides a completely new concept for such seismic explorations based on the merging of several more or less well-established fields of technology and science today, which gives a high degree of flexibility and makes it possible to design an optimum system for seismic explorations. Some main aspects of this new system are as follows:

New principles in radar technology involving matched radiation (illumination) make it possible to take advantage of apriori information regarding the object, i.e. the structures or subsurface layers under investigation. Based on such information the frequency bandwidth of the system can be narrowed and the sensitivity correspondingly increased. The aim of such a "self-learning" system is to have the appropriate seismic signatures stored in the transmitter unit processor and to structure this in such a way that only two bits of information is required: Is the particular structure present or is it not.

A specific aspect of the invention involves the fact that optimum illumination is achieved by coupling a set of sinusoidal acoustic waves to the wave propagation medium (i.e. water). By using matching networks in the form of resonant cavities, like what is known from microwave circuitry, there can be achieved a very high degree of matching over a narrow bandwidth.

Interaction mechanisms between acoustic and electromagnetic waves are well known in solid state physics and are utilized within electronics as a means of achieving high speed signal processing methods. As examples can be mentioned surface acoustic wave devices for implementation of filters and convolvers. Further can be mentioned opto-acoustic spectrum analysers based on surface acoustic waves in solids.

Thus, the present system is primarily designed for offshore oil and gas explorations and is based on the modern high-technology concept mentioned briefly above.

SUMMARY OF THE INVENTION

More specifically the invention relates to a system for marine seismic exploration of structures under the sea bottom, comprising a transmitter means with an array of acoustic transducers for synchronously and coherently generating one or more monochromatic acoustic waves in the water, and a receiver means for detecting acoustic waves reflected from these structures. What is novel and specific to the system according to the invention in the first place, consists therein that the receiver means comprises a radar system adapted to illuminate that area of the sea surface in which the reflected acoustic waves appear, in order to therein establish a number of interferograms each corresponding to the acoustic wave field from a scattering point in the structure given by the position of the point and the frequency of said field, and that said receiver means is adapted to determine the degree of coincidence between said interferograms and acoustic perturbation patterns affecting the electromagnetic reflection coefficient of the sea surface, thereby to obtain a recording of the seismic properties of said structures.

As will appear from the following description, much of the theory and explanations given apply both to electromagnetic waves (the radar part) and acoustic waves (the acoustic part) as these are incorporated in the new system described here.

BRIEF DESCRIPTION OF THE DRAWINGS

The invention shall be explained more closely in the following with reference to the drawings, of which.

DESCRIPTION OF THE PREFERRED EMBODIMENTS

THE BASIC CONCEPT

Figure 1:
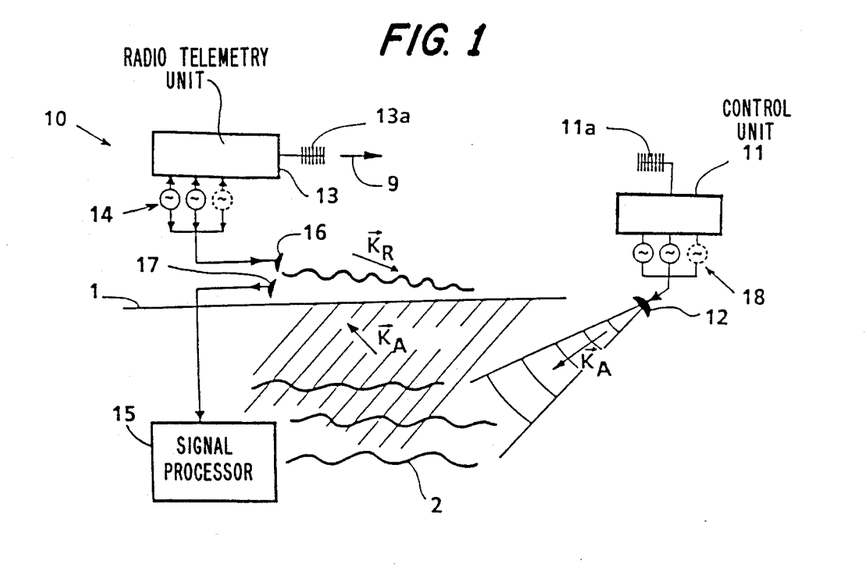
FIG. 1 illustrates the basic concept of the system according to the invention.

This is shown in FIG. 1. Beneath a water mass the surface of which is denoted 1 there is an underground structure 2 which for example can consist of several layers as indicated. A number of acoustic sources or generators 18 for acoustic sinusoidal waves with frequencies chosen so as to provide a "matched" radiation or illumination for the geological structure 2, feed one or more transducers 12 so that acoustic waves propagate through the water and further on to the geological structure 2. The different frequencies can be transmitted simultaneously or in succession. By diffraction and/or refraction the acoustic signal is scattered back from irregularities in the geological structure 2. These acoustic return signals are sensed either by a set of conventional microphones (hydrophones) or by means of a radar system generally designated 10, the radar wavelength of which is tuned so as to get a constructive coherent interaction with the acoustic waves caused on the water surface 1 by the return signals from the depth of the water. (The so called electro-acoustic or electro-optic effect). In order to achieve this, the acoustic generators are controlled by means of a radio telemetry system which provides for phase-locking of the acoustic part to the radar part or the radar wave pattern. More specifically the acoustic part comprises a control unit 11 with a receiver antenna 11a which from a radio telemetry unit 13 with transmitter antenna 13a receives control signals as indicated with arrow 9. On the other hand the unit 13 is connected to radar transmitter means 14, which inter alia comprises phase shifters and which through one or more antennas 16 illuminates the water surface 1 with radio waves for sensing the acoustic waves as mentioned above. The returning radio waves are received by a radar antenna 17, which is connected to a signal processor 15 having functions to be explained more closely in the following.

The acoustic generators 18 with associated transducer(s), which advantageously constitute a transducer array, are thereby all controlled by the radar system 10, which illuminates the water surface 1 so that there is provided a phase-locked coherent radar "hydrophone" system.

From the receiver antenna—possibly antennas—17 the signal processor 15 receives information with respect to amplitude and phase of each composite acoustic wave and thereby can provide information regarding the transfer function of the geophysical medium (mass of water and underground structures), by which the acoustic waves have been affected. The Fourier transform of this transfer function directly gives the desired delay function, i.e. the "echogram".

Such a system can operate in a self-learning mode, whereby the radar system estimates the condition of the water surface 1 and selects frequencies for the acoustic field and for the radar or interference field, which gives a maximum of contrast for the acoustic field with respect to the water surface. More particularly there can be implemented algorithms, which enhance the surface wave pattern (footprint) of the acoustic fields in relation to the background repredsented by the water surface. These algorithms can for example be based on Doppler-filtering and rigidity filtering.

Specific acoustic sources

In principle known forms of acoustic sources or transducers can be used in connection with the present new system, but these known designs have a poor efficiency and are not particularly well suited to the present invention. As mentioned, there is proposed an optimum acoustic coupling in connection with the new system, this coupling being achieved by resonant cavities tuned to the individual matched frequencies. These acoustic frequencies are phase-locked to a corresponding set of radar frequencies, as will appear from FIG. 1. At the end of this description the particular form of acoustic sources referred to here, shall be discussed more closely.

Figure 2:
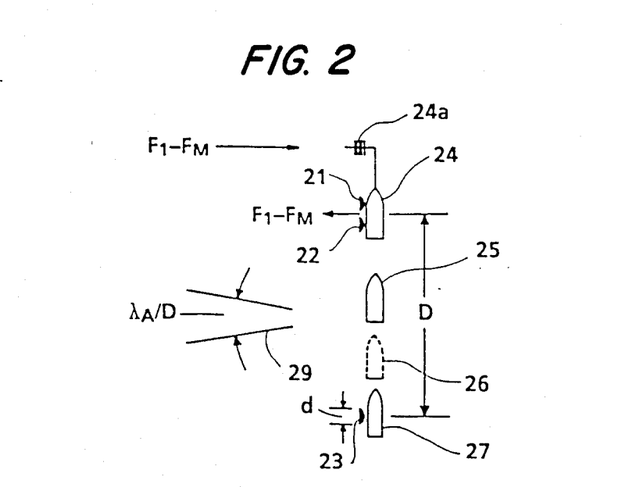
FIG. 2 schematically shows an acoustic source arrangement for providing a narrow multifrequency beam in the water, to be used in the system according to the invention.

Another important aspect is that concentration of the acoustic beam is achieved by a cooperating group or array of acoustic sources. Such a source array can be composed by means of a number of remotely controlled boats having acoustic sources in their bottom, possibly by having the boat bottom itself made in the form of "tuned drums", i.e. acoustic sources with resonant cavities as mentioned above. The relative position of these source array elements are measured accurately by mens of radio phase methods. FIG. 2 illustrates schematically such a group or array of acoustic sources for providing a narrow multifrequent acoustic beam in the water. There are shown four boats 24, 25, 26 and 27, of which boat 24 is provided with an antenna 24a for its control. Boat 24 carries 2 acoustic transducers 21 and 22 for transmitting frequencies F1 to FM under control by radio from a main station. Boat 27 is provided with an acoustic transducer 23. The boats are shown with different spacings so adapted that from the total array of acoustic transducers on the boats there will be emitted a single acoustic beam 29 having a beam angle $\lambda_A/D$ where D is the maximum extent of the source array elements. In such an arrangement, as shown in FIG. 2, there is obtained a beam sharpening factor of D/d, where d is the source or transducer aperture, as shown for transducer 23 on boat 27.

In view of the above it will be understood that the acoustic transducers can be arranged in an array which is one-dimensional, two-dimensional or three-dimensional for the purpose of providing harmonic, multifrequent signals. This arrangement of acoustic transducers on independent boats or vessels, the positions of which are determined by using radio navigation methods of high accuracy, makes it possible to compensate for deviations from an ideal position with respect to the other transducers in the array.

The principles of a radar "hydrophone"

Figure 3:
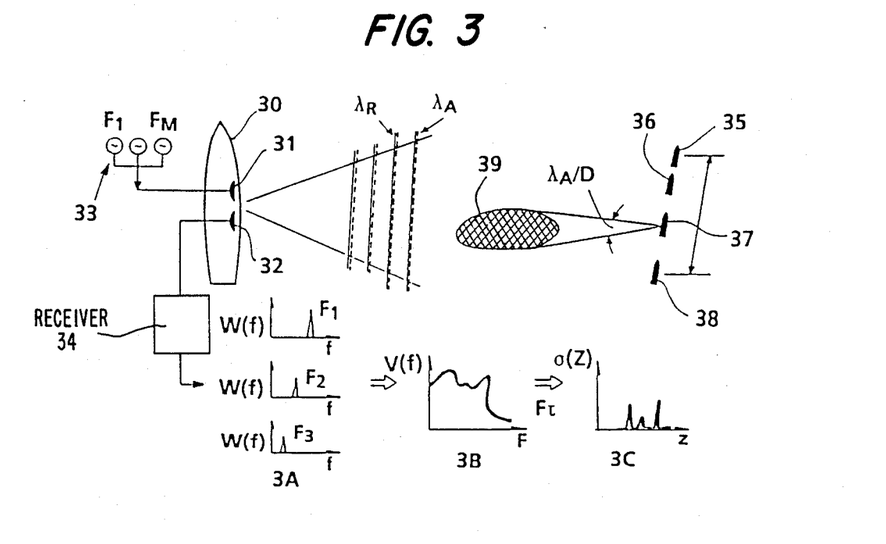
FIG. 3 schematically shows the principle of radar detection of acoustic wave patterns on the water surface, resulting from reflection and/or refraction of an emitted acoustic beam.

FIG. 3 additionally shows relationships as a supplement to the principle illustrated in FIG. 1, for explaining the so-called radar "hydrophone". A vehicle 30, for example an airplane, carries radar antennas 31 and 32 and generator 33 and receiver 34 for transmission and reception respectively, whereby the radar illumination is determined by the generators 33 for a number of frequencies F1 to FM. When transmitting acoustic waves from an acoustic source array established by means of four boats 35, 36, 37 and 38, there is provided at the water surface a resulting acoustic illumination or an acoustic surface wave pattern 39 (footprint), resulting from reflection and/or refraction of the acoustic beam transmitted towards underground structures of interest beneath the sea bed. As will appear from FIG. 3, the radar hydrophone is matched to the acoustic waves so that there is provided a maximum of contrast between the acoustic field and the natural wave phenomena or patterns, which might be present on the water surface. Thereby information about amplitude and relative phase for each frequency involved is obtained. Computing the transfer functions V(F) as indicated in diagram 3B on FIG. 3, gives information about the spatial distribution of the scatterers constituting the scattering medium, by a Fourier transformation. An alternative to this description is that the radar hydrophone transmitter anntenna has a fixed position on shore. The resulting delay function is shown in diagram 3C in FIG. 3. Such a system will have an inherent extreme sensitivity as a result of the following 4 factors:

The acoustic illumination from the source array on boats 35–38 is matched to the geological structure of interest, thus reducing the required wave number ($\vec{K}$) spectrum to a minimum.

The multifrequency radar hydrophone is matched coherently to the surface wave footprint 39 of the set of coherent sinusoidal acoustic frequencies employed, over a large surface area of the sea, which gives a very large "sensing area" being coherent in space and time.

The Doppler shift (diagram 3A in FIG. 3), which the scattered radio wave is subjected to as a result of the velocity of the acoustic surface wave pattern or footprint, is apriorily known. The width of the Doppler filters, i.e. one filter for each of the acoustic frequencies used, can thus be made very small, which results in an extremely low noise bandwidth.

The velocity of the acoustic wave ($V_A$) is larger by several order of magnitude compared to the velocity of the gravity waves on the sea surface and the incoherent motion caused by the local wind field. Therefore these will not or will only to a very small degree disturb the detection process.

INTERACTION MECHANISMS BETWEEN ACOUSTIC AND ELECTROMAGNETIC WAVES

Acoustic waves (sound waves)

As already mentioned previously and as illustrated in FIG. 4, acoustic waves 40 reflected from the sea floor and from structures underneath, will produce a pattern (footprint) on the water surface 41. This surface wave pattern can be detected by means of radio waves. The pattern is periodic provided that the field is a plane wave of a single frequency. The wave length is denoted by $\lambda_a$. It appears from FIG. 4 that the period $\Lambda$ of the surface wave pattern on the water surface 41 depends on the angle $\alpha$. It is evident from the figure that the period $\Lambda$ of the pattern is larger than the wave length. Thus, the pattern on the surface travels with a velocity that is larger than the velocity of the wave itself, which is roughly 1500 meters/second.

Figure 4:
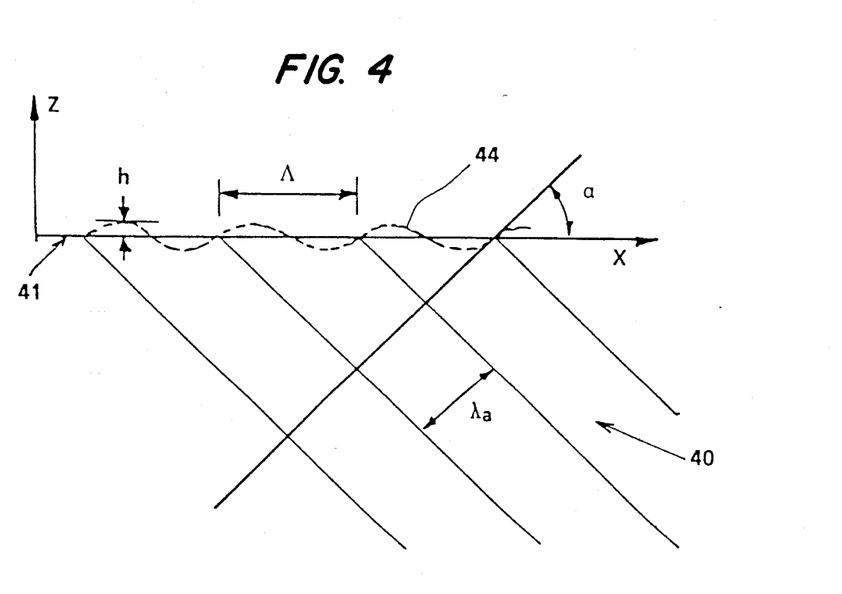
FIG. 4 is a diagram showing the formation of a surface wave pattern resulting from acoustic waves from the depth of the water mass.

This acoustic wave, which comes from below, causes the water surface to deviate from its "ideal" plane level so as to take the form of a sine curve 44 as shown dotted in FIG. 4. The amplitude h of this curve depends on the power carried by the acoustic wave. If, for instance, this power is 1 milliwatt per m$_2$, the amplitude is about 1 micrometer. As mentioned, there will normally exist ordinary ocean waves (gravitation waves and capillary waves) on the water surface 41. Some of these waves may easily have amplitudes of several meters. It may still be possible to detect the acoustic surface waves or sound waves 44, because they have a behaviour quite different from that of ordinary ocean waves. If the acoustic frequency employed is 30 Hz, which is an attractive frequency for seismic explorations, the wave length $\lambda_a$ will be 50 meters. The resulting surface wave pattern 44 may then have a period depending on the angle $\alpha$, of about 70 meters and travels at a velocity of 2100 meters/second. In contrast a gravitational wave of wave length 100 meters has a frequency of 0,12 Hz and travels with a velocity of 12 meters/second.

Radio waves

By assuming that the water surface (as already mentioned) is illuminated from above by a radio wave 42 (see FIG. 5), which is also a plane wave of a single frequency and with a polarization as shown, the interaction between the acoustic surface wave pattern and the electromagnetic waves can be studied more closely. From FIG. 5 it appears that the angle of incidence of the radio waves 42 is $\gamma_i$. Moreover, reference is made to FIG. 6, in which there is indicated an area $A = l \times w$ of the water surface being illuminated from above with the radio wave 42 and from below by the sound wave 40 (FIG. 4). It is assumed that the dimensions l and w of this area are large compared with the wave lengths $\lambda$ and $\Lambda$.

Figure 5:
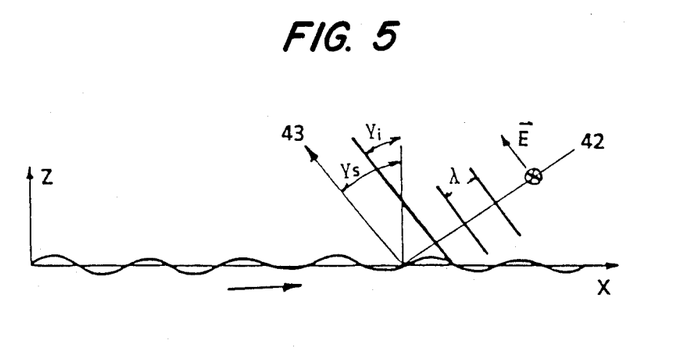
FIG. 5 shows the scattering of an electromagnetic wave, which illuminates a water surface with an acoustic wave pattern of the kind illustrated in FIG. 4.
Figure 6:
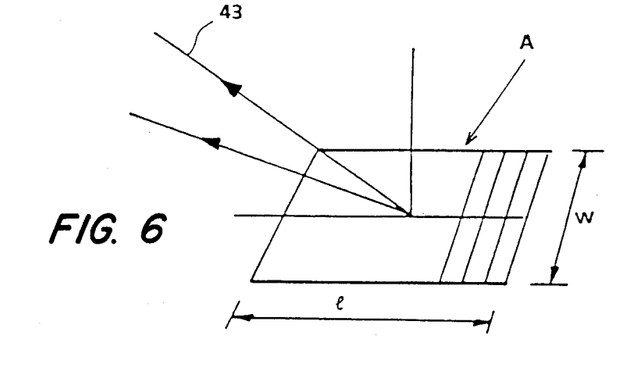
FIG. 6 illustrates coherent scattering from an area of the water surface having an acoustic wave pattern and being illuminated with electromagnetic waves.

Most of the incident electromagnetic power will be reflected in ordinary manner. However, a small part of the incident radio wave power will be scattered coherently by the tiny perturbations or acoustic surface wave patterns 44 being generated on the surface 41 by the acoustic sound field 40. In FIGS. 5 and 6 this back-scattered portion of the incident radio wave 42 is designated 43. This has a scattering angle designated $\gamma_s$ and a frequency $\omega$.

The amplitude of the back-scattered wave at a distance R from the scattering area A is proportional to the quantity:

$$\frac{A}{R\lambda^2} (P_a P_{em})^{\frac{1}{2}} = \frac{1}{R\lambda^2} (AP_a)^{\frac{1}{2}} (AP_{em})^{\frac{1}{2}}$$

where $P_a$ is the acoustic power density (power per square meter) and $P_{em}$ is the electromagnetic power density. It is worth noting that the scattered field is proportional to the square root of the total acoustic power directed into the area A. Likewise, the field is proportional to the square root of the total electromagnetic power. The sensitivity of the radar hydrophone will thus increase with increasing power in the radio wave employed.

Figure 7:
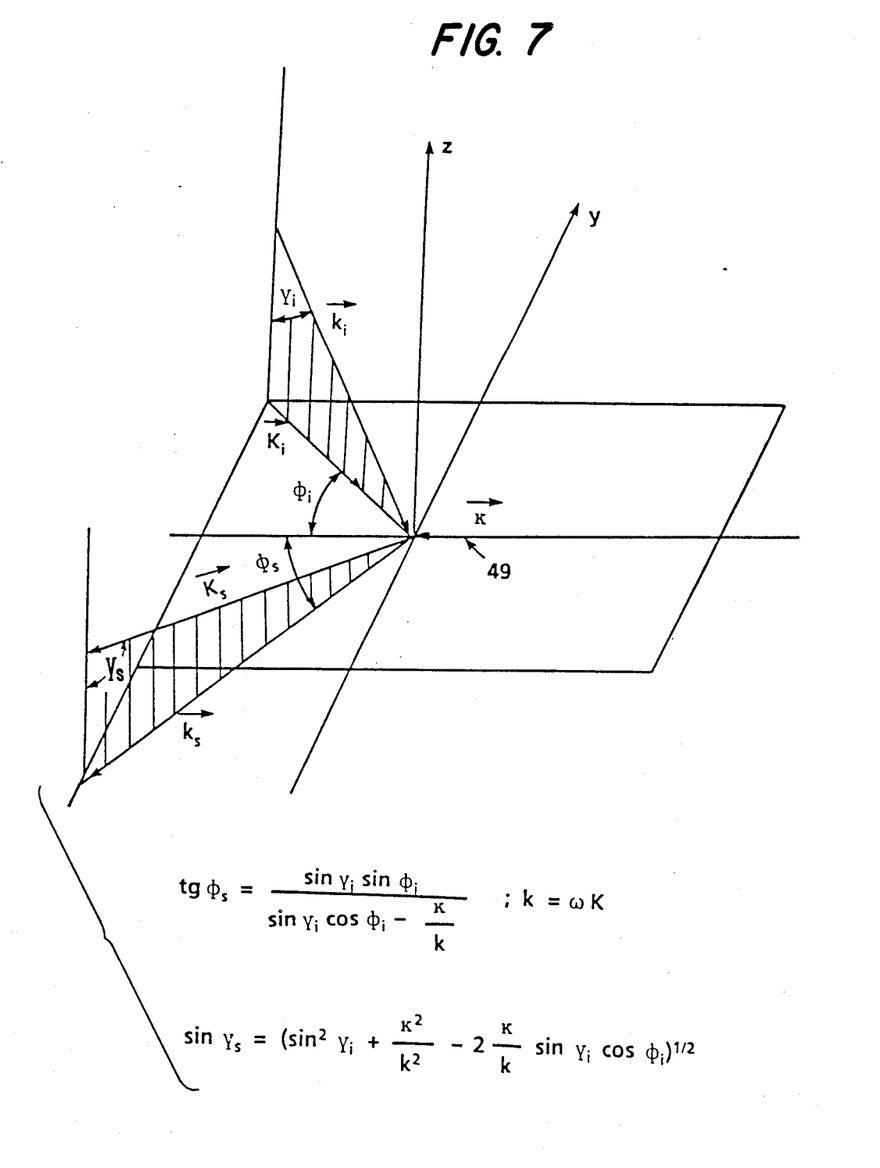
FIG. 7 shows more in general as a spatial diagram, which magnitudes are involved in and determine the scattering of electromagnetic waves caused by an acoustic wave.

FIG. 7 with associated mathematical expressions show additional relationships in the scattering of an electromagnetic wave caused by an acoustic wave 49. This represents a generalization with respect to the preceding discussion, which for simplicity was restricted to the case when the plane of incidence of the radio wave also contains the wave vector of the acoustic wave.

Figure 8:
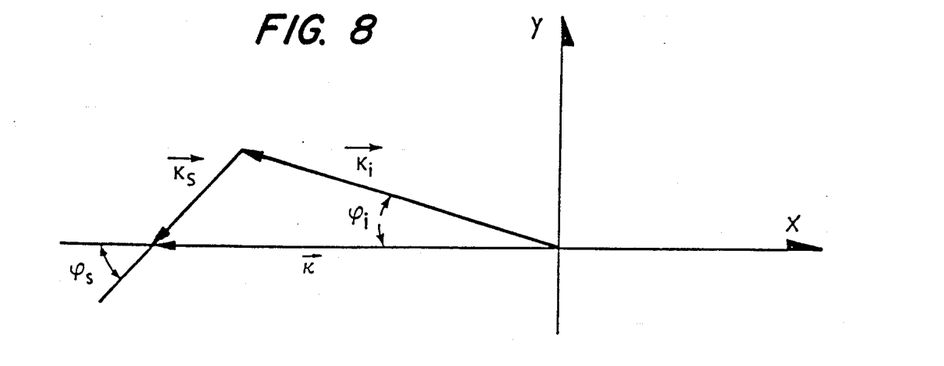
FIG. 8 shows the determination of scattering angles by geometrical construction.

In FIG. 8 the projections of the wave vectors are denoted $\vec{k_i}$ and $\vec{k_s}$ respectively. The scattered wave $k_s$ has a frequency equal to the sum of the incident wave and the acoustic wave's frequencies. Another scattered wave, which is not shown in the figure, may also be present, with a frequency equal to the difference between the same frequencies.

FIG. 7 shows how the scattering angle in the horizontal plane, $\phi_s$, can be determined by a simple geometrical construction. The angle $\gamma_s$ formed by the wave in relation to the vertical direction, is then determined by the length of $\vec{k}_s$ being known and equal to $\omega/c$.

In practice the acoustic wave is not always a plane wave. The wave fronts may be curved and the apparent wave length may change along the direction of propagation. Modification and adaption in view of these problems may be made by experts on the basis of the general theory presented here, without any necessity for discussing this more closely here.

From the above it also appers that on the basis of knowledge of the frequency of the acoustic field and by using only one interference pattern, there can be provided information simultaneously with respect to the scattering coefficients for a number of depth layers or underground structures.. In this are involved the local angle of incidence and the phase velocity of the acoustic waves and requirements with respect to matching of wave number and velocity.

MULTIFREQUENT MATCHED ILLUMINATION

Given all degrees of freedom one can visualize many schemes for enhancing the total scattering from an object of interest (see surface, underground structure) at the expense of the contribution from the background against which the object is viewed. In connection with this invention, however, one is facing the rather general problem of matching a radiation or an illumination to four dimensions (3 in space and 1 in time), and it is of importance to offer a unified method in the sense that all four dimensions are addressed in the same manner. Seeking a system where the four dimensional tailoring of the illumination is individual for each dimension, will at best complicate the issue. It is also likely that such particular solutions would prove to be suboptimal.

Accordingly, the problems shall here be solved in general terms, considering the scattering object (surface) to be characterized by a four-dimensional irregularity spectrum (wave numbers spectrum). This approach is based on well-founded generalized Fourier theory, such as the classical theory presented by Wiener (1930). This involves describing the scattering surface as decomposed into its Fourier components to which individual continuous and sinusoidal electromagnetical waves are matched.

It will easily be seen that this involves a superposition of a set of individual phase-locked sine-waves (Fourier components) from individual electromagnetic oscillators, so as to produce a wave-form that is matched to the structure (Fourier components) of the scattering body or object. For this approach to be meaningful in relation to practical objects, one must confine oneself to an object characterization based on the diffuse back-scattered component. This means that the scattering surface must be illuminated with waves, whose wave length is small compared with the roughness scale of the scattering object (-surface/-structure).

Figure 9A:
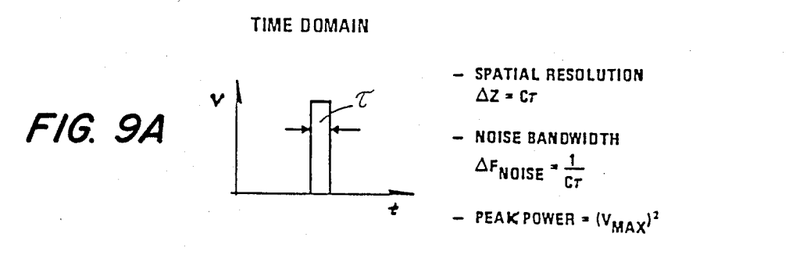
FIG. 9 shows in two diagrams the spatial resolution in a pulse system (time domain), and in a multifrequency system (frequency domain)
Figure 9B:
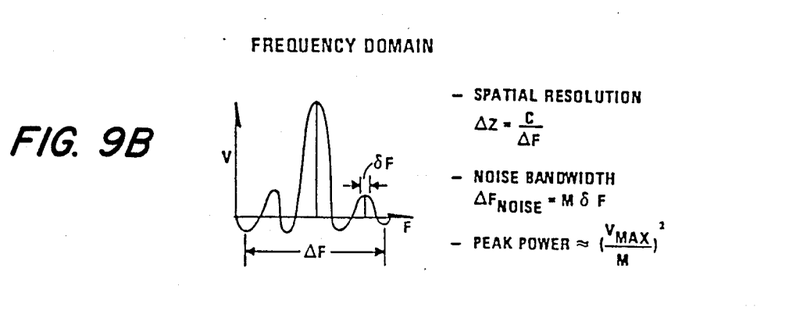

For readers who are not quite familiar with Fourier domain operations and corresponding matched illumination wave number matching, it may be of interest to present an approach from a different angle. For this purpose FIG. 9 is presented. In this figure diagram 9a shows certain relationships in the time domain and diagram 9b corresponding relationships in the frequency domain. Thr spatial resolution of a pulsed system is determined by the pulse width ($\Delta Z = C\tau$). In order to obtain the same spatial resolution by means of a multifrequency "interferometer" system, a bandwidth $\Delta F = C/\Delta Z$ is required. By resolving the rectangular pulse into its Fourier components (coefficients in the Fourier expansion), the basis for an equivalent multifrequency system is acquired. The rectangular pulse is composed from a set of continuous wave oscillators with frequency and amplitude determined by the coefficients of the Fourier expansion. It is to be noted that the receiver noise bandwidth of such a multifrequency system is very much reduced in relation to the corresponding pulsed system.

What is described here has some relation to the method proposed by present inventors Gjessing and Hjelmstad in International Patent Application No. PCT/NO86/00003. With advantage the method described therein can be employed also in connection with the present invention.

The wave number matching mentioned above shall now first be discussed in a qualitative, semi-intuitiv manner based on simple principles of physics. Afterwards a short mathematical approach shall be presented.

Wave number matching

For detecting or identifying object structures by means of wave number matching (spatial resolution), the object is illuminated with a set of electromagnetic or acoustic waves having different but mutually correlated frequencies. The properties of the back-scattered signal are observed and from this there can be drawn very definite conclusions about the distribution of the scatterers constituting the scattering object or body along the direction of radio wave propagation.

Figure 10A:
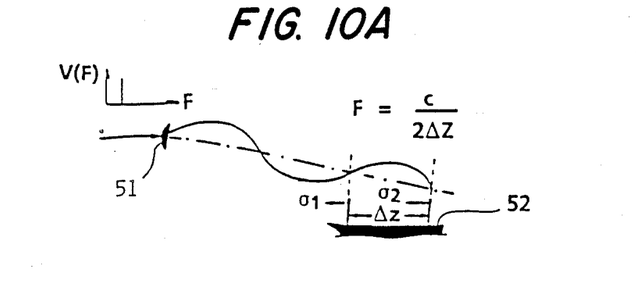
FIG. 10 illustrates wave number matching based on the carrier frequency itself and a beat frequency pattern respectively.
Figure 10B:
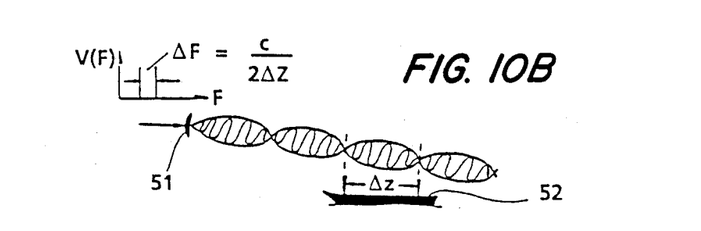

With reference to FIG. 10 a simple object is first considered, for example a ship 52 being represented by two identical scattering centers or reflection points having a spacing of $\Delta z$ longitudinally along the direction of wave propagation. From an antenna 51 this object is illuminated with a wide spectrum of frequencies, and the set of interfering waves scattered back from the object is analyzed (inversion techniques). Two illuminating waves can be considered. As the difference in frequency between the two waves increases, a situation arises where the waves reflected from the two reflection points arrive in antiphase at the receiving site, causing a minimum in the resulting interferogram. If the carrier wave frequency itself is taken as a basis (diagram 10A in FIG. 10), a carrier frequency given by $F = c/2\Delta z$ gives constructive interference from two scattering centers spaced $\Delta z$ apart. In exactly the same way a beat frequency pattern (diagram 10B) can be matched to the reflecting structure by choosing two illuminating sine-waves with a spacing $\Delta F = c/2\Delta z$, i.e. by choosing a $\Delta \vec{K}$ of the illuminating wave, which is matched to a wave number of the scattering structure. If a complicated reflecting object is concerned, being characterized by several pairs of scattering centers (several Fourier components), the same number of frequency pairs are needed for the $\Delta K$-matching or several frequencies for the K-matching.

Figure 11:
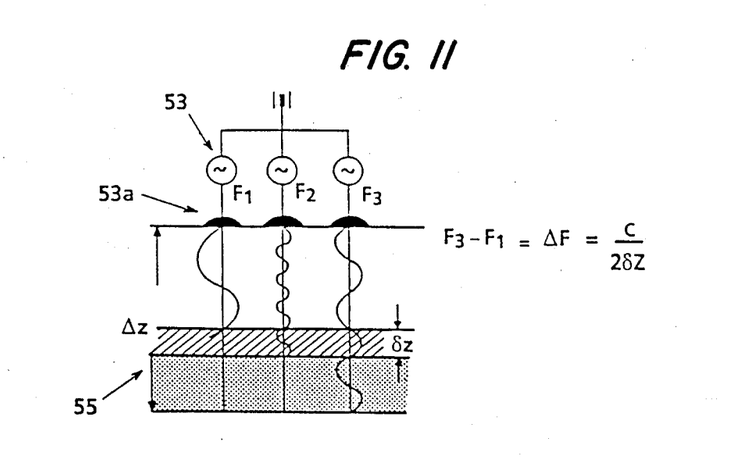
FIG. 11 shows matched illumination making use of apriori information about the wave propagation medium.

If there exists apriori information about the sub-surface structure to be explored and it is desired to ignore certain information, the illumination can be matched to the known part of the propagation medium. This is illustrated in FIG. 11. In this figure there is shown an example of the use of three frequencies from generators 53 with corresponding radiation apertures 53a (antennas or acoustic transducers) illuminating a structure 55 consisting of several layers (model). The number (M) of different frequencies employed is equal to the number of layers in the case when a model is concerned. If there is no model, the number of resolution cells required is equal to $M = \Delta Z/\delta Z$.

Figure 12:
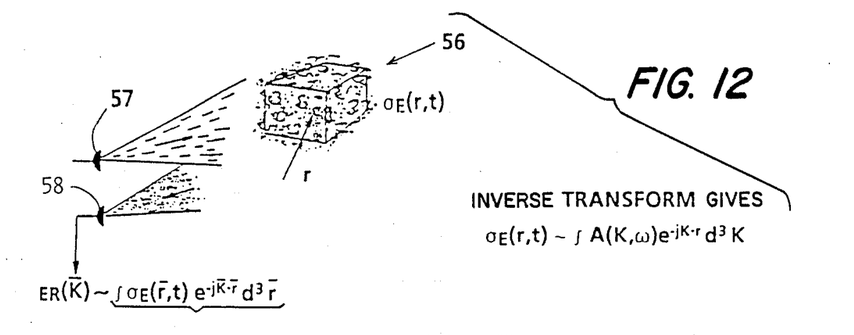
FIG. 12 schematically illustrates how any scattering object characterized by a distribution in space of scattering elements, can be decomposed into its Fourier-components.

FIG. 12 schematically illustrates how any scattering object 56 characterized by a distribution in space of the scatterers ($\sigma_E(\vec{r})$) can be decomposed into its Fourier components $A(\vec{K})$. There will be constructive interference from all these scatterers if there is chosen a combination of illuminating sine-waves $E_r(\vec{K})$ that couple to each of the Fourier components $A(\vec{K})$ of the scattering object. There will be matched illumination when $E(\vec{K}) = A^*(\vec{K})$.

A very important aspect of the matched illumination concept is the radar's ability to optimize the contrast between the useful signal provided by the acoustic field, and the background clutter (sea waves, turbulence etc.) in a self-learning mode. The radar measures the sea state and the detailed behaviour of the scatterers on the sea surface and avoids or compensates for the components in the 4-dimensional spectrum that are due to natural wind and wave fields.

Focusing

Improved detection and identification of structures are possible by employing focused acoustic and electromagnetic radiation arrays. As mentioned previously, it is possible simultaneously to obtain wave number and wave velocity matching by using suitably selected discrete frequency lines.

Figure 13:
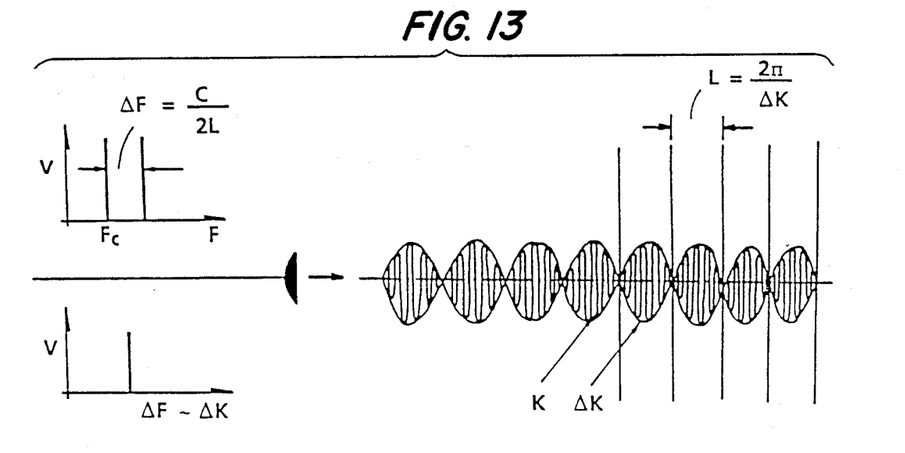
FIG. 13 shows matching to periodic wave structures (patterns)

FIG. 13 shows matching to periodic wave structures obtained by simply selecting frequencies (or frequency spacings) for matching to the acoustic wave length.

In applications where the structure of interest is moving with a velocity V with respect to the radar (e.g. when the structure is the acoustic wave field at the air/sea interface migrating with a velocity $V = C_s/\sin\alpha$ where $C_s$ is the velocity of sound), a 4-dimensional matched filter can be realized through the use of phase shifters. By spinning the phase of the transmitted waves with a rate $f = 2V/cF$, the resulting hologram (interference pattern) will move or migrate at a velocity equal to the velocity of sound.

Figure 14:
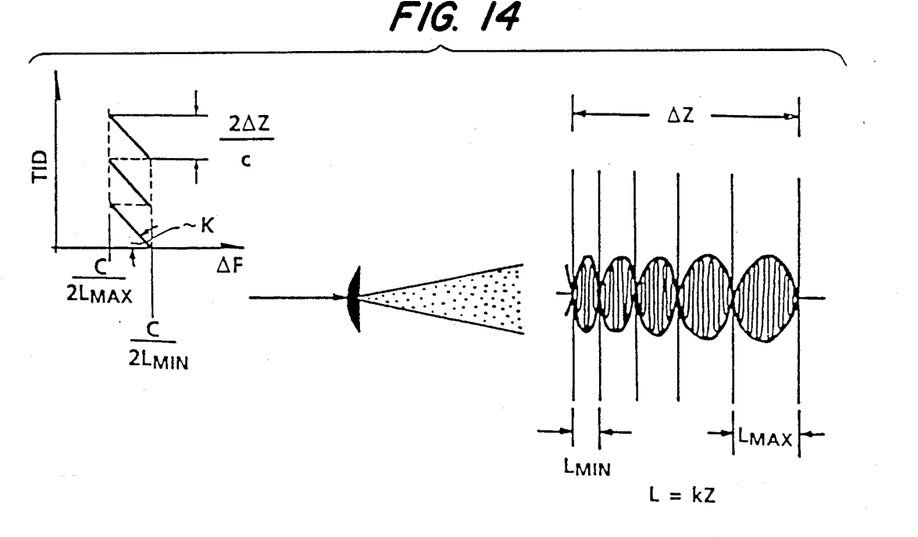
FIG. 14 shows matching to a frequency modulated wave structure.

By using time-varying frequency components it is furthermore obvious that matched filters can be realized for structures with varying wave number versus position. This is explained by means of FIG. 14 where a linearly changing frequency versus time provides an interferogram with continuously varying local wave number.

Figure 15:
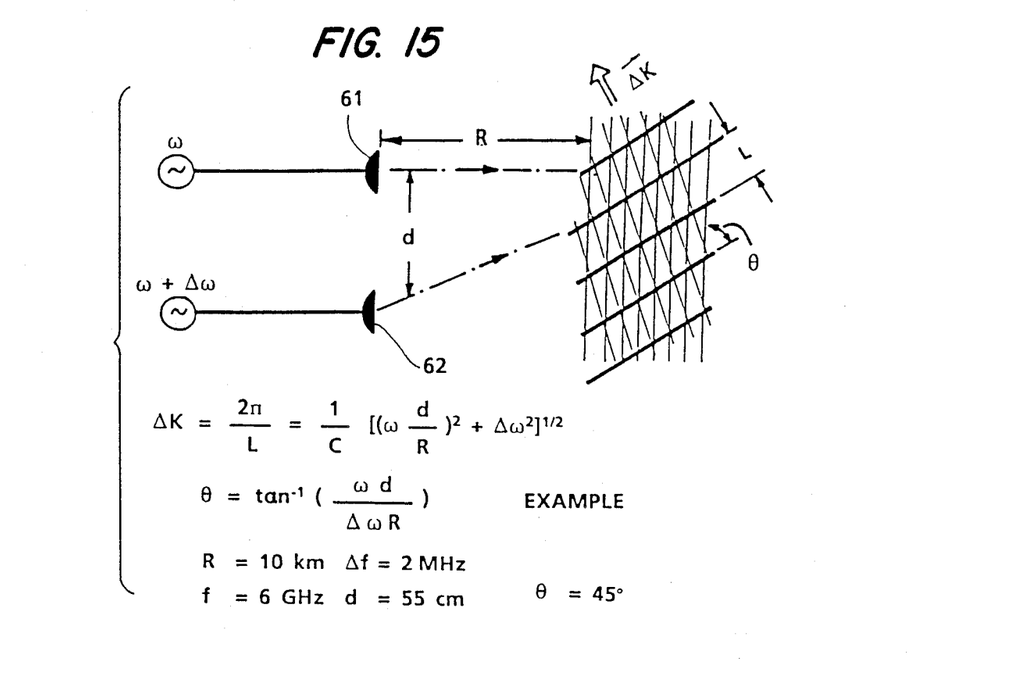
FIG. 15 illustrates the use of and the advantages of having multiple apertures in the system.

In the same way, using multiaperture, multifrequency techniques, any orientatiion of the resulting holograms can be obtained. This is illustrated in FIG. 15, wherein as an example there are shown two apertures 61, 62 (antennas or acoustic transducers) driven by a separate generator or signal source. This figure also contains a numerical example. Thus, more particularly the radar part of a system according to the invention can have a number of apertures located side by side for generating wave number vectors in any direction.

Figure 16:
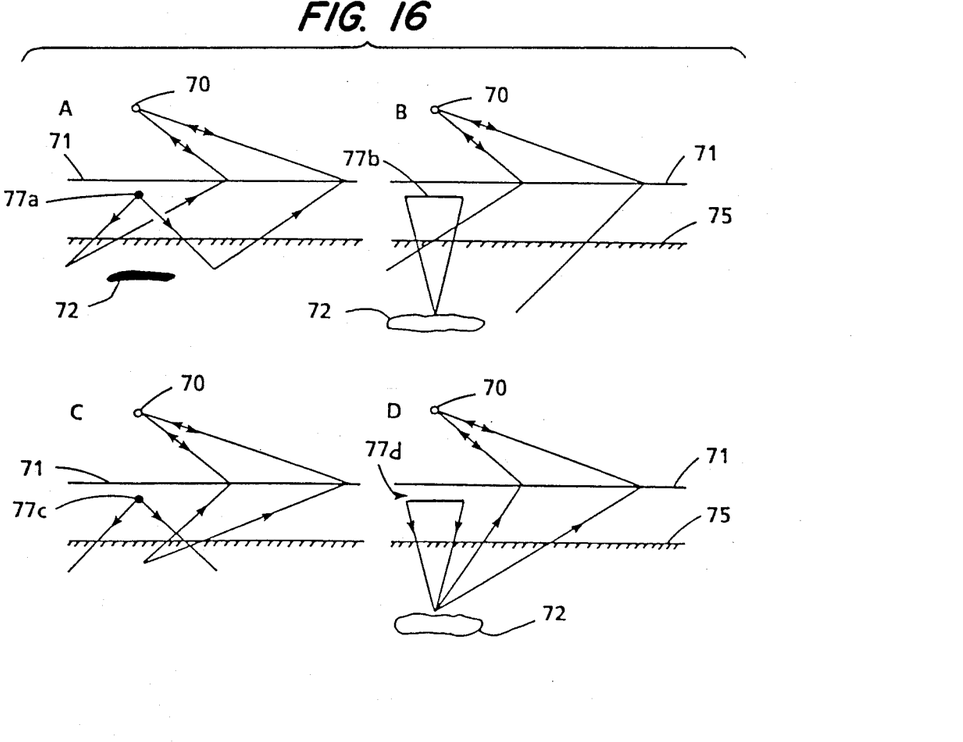
FIG. 16 shows the effect of focusing the acoustic and/or the electromagnetic system.

From the above it appears that the focused matched filters can be realized in connection with the invention and that this gives a much improved sensitivity of the system. FIG. 16 indicates how the focusing can be effected for the acoustic and the electromagnetic part of the system respectively. In the separate diagrams A, B, C and D in FIG 16 water surface is designated 71 and a sub-surface object 72, whereas the sea bed is designated 75. The position of the radar is shown at 70, whereas corresponding acoustic sources or source arrays respectively are shown at 77a, 77c as well as 77b and 77d respectively. The various combinations of focusing serve to improve the detection and mapping performance. More particularly diagram A indicates a situation in which none of the system parts are focused. In diagram B the acoustic system beam energy is focused at specific points in the sub-surface structure 72. The radar part here operates without focusing. In diagram D the radar part is adapted for synchronously scanning with the acoustic source array. Diagram C is based on a focused radar part scanning the area illuminated with the acoustic part 77c.

Figure 17A:
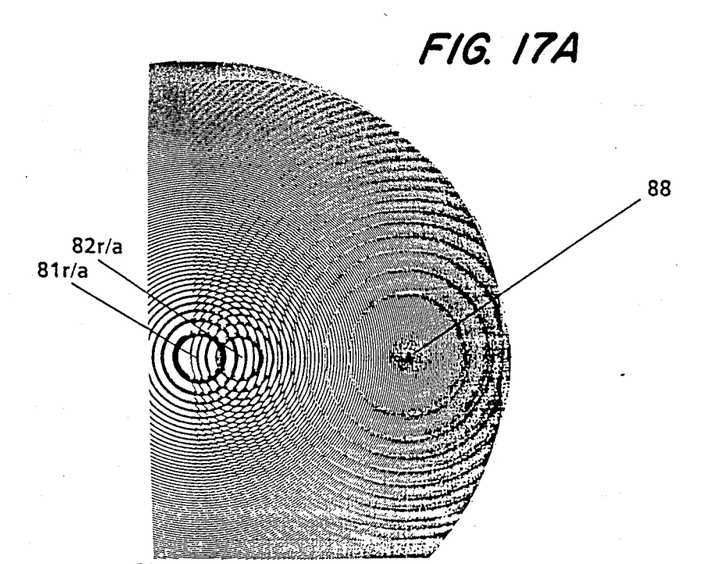
FIG. 17 illustrates the scanning of an area with movable focal points.
Figure 17B:
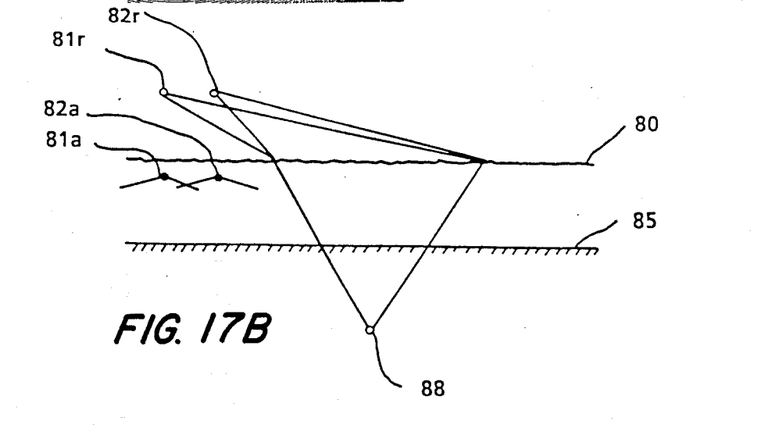

FIG. 17 shows in the horizontal plane 17A and in vertical section 17B respectively, how a focal point 88 for the combined acoustic-electromagnetic system can be scanned with high speed. The focal point 88 can be located at an arbitrary distance from the radar antenna array 81r–82r or the acoustic source array 81a–82a. The focal point 88 can be directed to any structure of interest in the sub-surface formations beneath the sea bed 85. The sea surface is shown at 80.

From the above it appears that one of the system parts (the radar part) can be stationary and remotely located, whereas the other part (the acoustic part-source array) can be movable.

Moreover, it has appeared that the illuminated area (footprint) has large dimensions compared to the wave length of the acoustic interference pattern, so that there is obtained a focusing effect, and that there is employed a number of frequencies for matching to acoustic waves having their phase centers directly beneath the position of the radar. Advantageously the radar can be provided with more than one aperture and can operate with time varying frequencies thereby to generate interference patterns corresponding to a focused acoustic wave, the phase center of this acoustic wave being able to have an arbitrary position in three dimensions in relation to the radar platform or position.

SPATIAL CORRELATION OF ACOUSTIC WAVES

Earlier in this description there has been a discussion of the correlation properties of acoustic waves having different frequencies. By measuring the degree of correlation between waves having different frequencies, there is obtained information about the longitudinal distribution of the scatterers. When dealing with a thin reflector (zero distribution in depth or length), then the bandwidth of the reflector is very large. Conversely, if the scatterers are distributed over a large region in space, the bandwidth is small.

The attention shall now be focused on the transverse distribution of the scattering elements constituting the scattering object. In order to reveal this transverse structure, use is made of another characteristic property of acoustic waves, namely their spatial correlation properties. This forms the basis for a synthetic aperture method. The scattering object shall be illuminated with one single frequency, and at the receiving site there is used a set of antenna elements distributed along a baseline or in a plane which is perpendicular to the line joining the receiving antenna array and the scattering object. At each element the amplitude and the phase of the impinging wave are measured. On the basis of these point observations of field strength, information about the object or structure can be extracted. This shall be explained more closely in the following.

Figure 18:
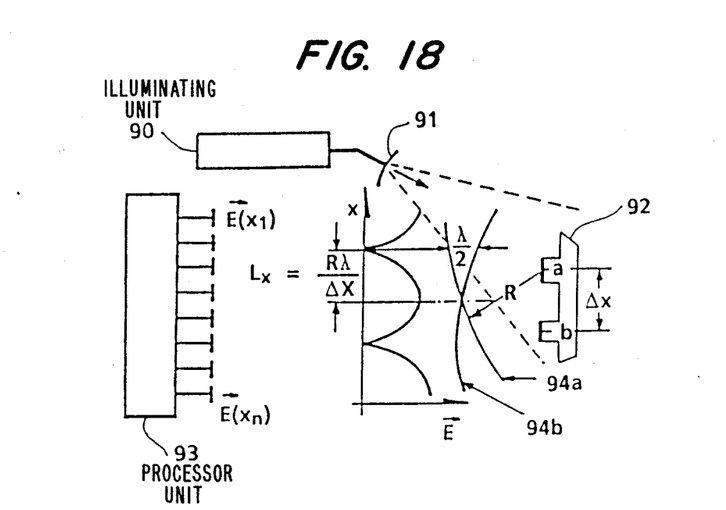
FIG. 18 shows how a transverse spatial interference pattern gives information about transverse shape and size of a scattering object.

FIG. 18 illustrates the scattering process. Provided that the position of an object 92 is known, the transverse spatial interference pattern will give information about the transverse shape and size of the scattering object. The surface of the object is illuminated with a single wave, for example from an antenna 91 having a drive or illuminating unit 90. Depending on the properties of the surface, there is obtained a certain field stength distribution of the back-scattered field $\vec{E}(s(x))$. 94a and 94b designate the phase front from 92a and 92b respectively.

The basic principle of spatial interferometry (based on a synthetic aperture antenna) further appears from FIG. 18. Measuring the transverse spatial distribution of intensity takes place in a processor unit 93 with an accompanying antenna array. The processor unit 93 gives information about the transverse shape and size of the scattering object if the range thereof is known.

Now follows a calculation of the angular distribution $P(\theta)$ scattered from a surface. It has been deduced earlier (Gjessing 1978a) and besides is intuitively rather evident that the field strength of the back-scattered wave from an object characterized by the delay function $f(\vec{z})$ is given by:

$$v\left(\frac{\omega}{c}\right) \sim E(\vec{K}) \sim \int f(\vec{z}) e^{-j\vec{K}\cdot\vec{z}} d^3\vec{z} \qquad (1)$$

From the above equation the following expressiion is found for the back-scattered field expressed by the intensity distribution over the scattering surface.

$$\vec{E}_s(\vec{K}) \sim \int E(x) e^{-j\vec{K}\cdot\vec{x}} d\vec{x} \qquad (2)$$

since $$K = \frac{4\pi}{\lambda} \sin\frac{\theta}{2} \approx \frac{2\pi}{\lambda} \theta \qquad (3)$$

(for small angles)

this equation shows how the back-scattered field is distributed in the direction $\theta$. From this the angular power distribution $P(\vec{K})$ is deduced as follows (Gjessing and Boerresen 1968):

$$\begin{aligned}
P(\vec{K}) &\sim E_s(\vec{K}) E_s^*(\vec{K}) \qquad (4) \\
&\sim \int\int E^*(\vec{x}) E(\vec{x}+\vec{r}) e^{j\vec{K}\cdot\vec{x}} e^{-j\vec{K}(\vec{x}+\vec{r})} d^3\vec{x}d^3\vec{r} \\
&\sim \int d^3\vec{r} e^{-j\vec{K}\cdot\vec{r}} \int d^3\vec{x} E(\vec{x}) E(\vec{x}+\vec{r})
\end{aligned}$$

The second integral above is immediately recognized as the spatial autocorrelation $R_E(\vec{r})$ of the field strength distribution. Hence $$P(\vec{K}) \sim P(\sin\theta) \sim \int R_E(\vec{r}) e^{-j\vec{K}\cdot\vec{r}} d^3\vec{r} \qquad (5)$$

Figure 19:
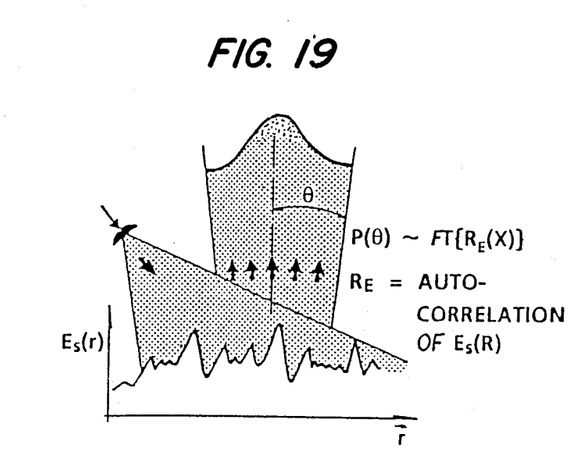
FIG. 19 illustrates the geometry of the back scattering process.

This equation shows that the angular power spectrum (radiation pattern) of the scattered wave is the Fourier transform of the intensity distribution over the scattering region when this distribution is expressed statistically in terms of its spatial autocorrelation, as illustrated in FIG. 19.

Thus, FIG. 19 shows the geometry of the back-scattering process. The illuminating field gives rise to a scattered intensity distribution $\vec{E}_s(x)$.

The above relationship is well known from antenna theory: The radiation pattern or diagram (the angular power distribution) of an antenna with aperture A is obtained by the Fourier transform of the intensity distribution over this aperture. Thus, if the above function $\vec{E}(x)$ is rectangular, which implies that the intensity is evenly distributed over the antenna aperture, then the angular power distribution is of the form $(\sinus \theta/\theta)^2$ and the beam-width $\beta = \lambda/D$ where D is the aperture size. Conversely, if the intensity distribution over the aperture is of the form sinus $x/x$, then the angular distribution of the back-scattered wave will be rectangular.

Equation (5) above shall now be considered again and used as a basis for studying another important property of the scattered field, namely the spatial correlation of intensity.

In the preceding discussion the case of a "transmitting antenna" was taken as a starting point. Now the situation shall be considered at the receiving side. the receiving antenna consists of a set of antenna array elements which makes possible measurements of amplitude and phase at each element in the antenna array. The power reaching this array antenna is distributed as $P(\theta)$ over an angular region. Applying the inverse Fourier transform and beside by intuitive consideration, it can be found that information about the spatial correlation properties of the field strength is obtained as follows:

$$R_E(\vec{r}) \sim \int P(\vec{K}) e^{j\vec{K}\cdot\vec{r}} d\vec{K} \qquad (6)$$

This equation says that the spatial correlation of the scattered field is the Fourier transform of the angular power distribution.

From FIG. 18 it is seen that if an object of transverse extent $\Delta x$ shall be resolved by means of a receiving antenna array at a distance R from the object, it is necessary to measure the intensity distribution over a spatial region $Lx = R\lambda/\Delta x$.

Summing up the above, it can be remarked that by measuring the intensity distribution across a broadside array (measuring amplitude and phase at each antenna array point), direct information is obtained about the transverse scattering properties of the scattering object.

Figure 20A:
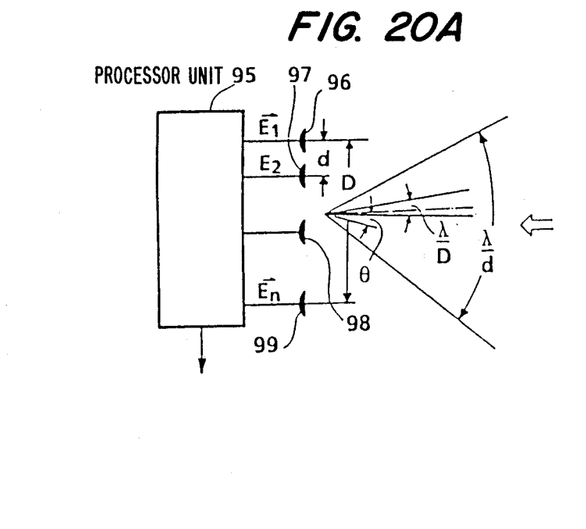
FIGS. 20A and 20B serve to explain the relationship between the extent of an antenna or transducer array and the resolution obtained.
Figure 20B:
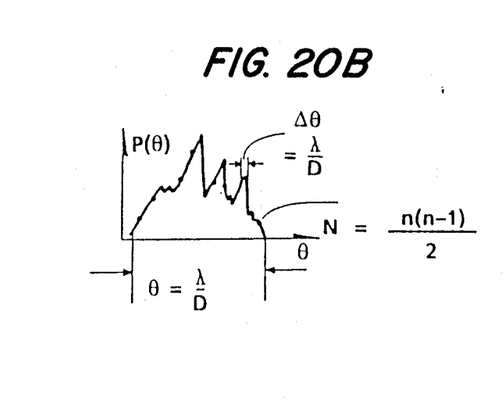

This is illustrated in FIG. 20. Therein is shown (FIG. 20A) an antenna array consisting of antenna 96, 97, 98 and 99 with an accompanying interferometer processor unit 95. If the antenna array 96 to 99 consists of n elements with unequal spacing, there will be $$N = \frac{n(n-1)}{2}$$

points on the spatial covariance function (angular power spectrum). If the total extent of the antenna array is D, the resolution of this system will be $\Delta\theta = \lambda/D$. If phase can be measured with a resolution of $\phi$ degrees, the angular resolving power becomes:

$$\Delta\theta = \Phi/360 \lambda/D \quad (7)$$

Within the sector $\theta$ there will be no ambiguities $$\theta_{nonambigous} = \lambda/d$$

(d is the smallest spacing between elements.)

It will be realized that there is analogy between this spatial autocorrelation function and the autocorrelatin function in the frequency domain as discussed above. In the multifrequency case there can be "filtered out" certain longitudinal spatial distributions of the scattering object by using frequency filters. With a broadside antenna it is possible to "filter out" certain transverse properties of the scattering elements by providing a "spatial filter".

With a multifrequency mulit-aperture system the two-dimensional Fourier transform (the hologram) of the scattering surface will be obtained directly. If by matched illumination there is produced a hologram of the structure of interest, there is obtained a system with optimum sensitivity and identification capability.

In connection with the present discussion of the angular power spectrum of back-scattered acoustic waves, both the transmitting side and the receiving side have been considered, in order to best illustrate the physics of the problem. This treatment is based on the common and known assumption of reciprocity.

In connection with the above it may be of interest to consider a bistatic seismic system which is very much analogous to a bistatic radio wave scatter system.

Here no use shall be made of any radar hydrophone as discussed earlier, but rather a set of tuned receiver hydrophones for continuous waves, these being almost identical to the transmitter arrangement based on "tuned drums" mentioned previously.

There are employed a number of small remotely controlled boats like in the transmitting case. The receivers are synchronized with the transmitter generators by radio telemetry. This makes it possible to use receiver elements with extremely small bandwidth and correspondingly high sensitivity.

Figure 21:
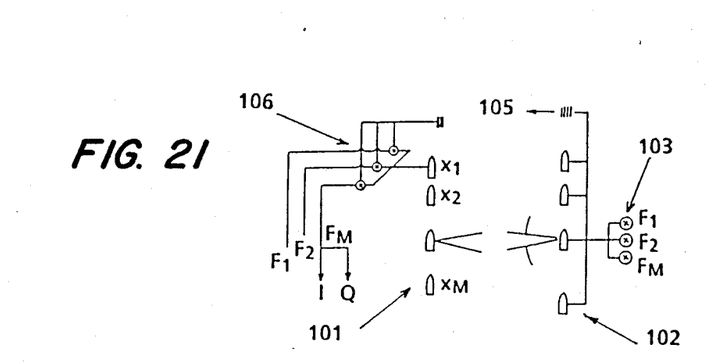
FIG. 21 shows a bistatic synchronized acoustic system with several controlled acoustic transducer arrays.

Furthermore, by keeping track of absolute phase for all the frequencies at all the array element points, a dedicated high resolution mapping of the geological structure can be accomplished. This is illustrated in FIG. 21. The bistatic synchronized acoustic system in FIG. 21 comprises two groups 101 and 102 of remotely controlled element arrays communicating with each other through a radio telemetry channel indicated at 105. The group 102 is driven by a number of generators 103 having frequencies indicated at F1, F2 and FM, whereas the receiver side has corresponding detectors etc. as indicated at 106. In addition to high sensitivity as mentioned, this system gives a large spatial resolving power both with respect to range (depth) and azimuth.

Figure 22:
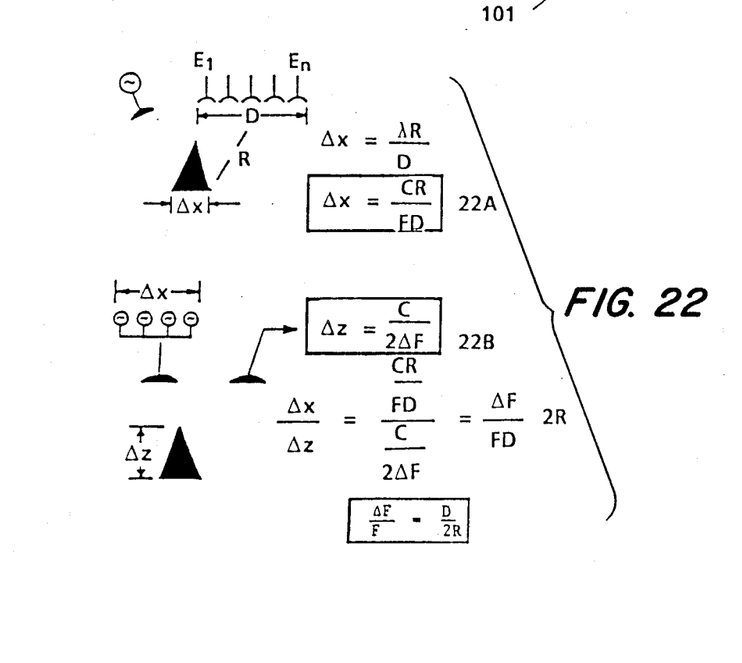
FIG. 22 gives the conditions for equal resolution transversally and longitudinally.

In summing up what is explained above on transverse resolution and longitudinal resolution, respectively, reference is made to FIG. 22. In this figure it is seen that for equal transverse and longitudinal resolution, i.e. $\Delta x/\Delta z = 1$, the following conditions have to be satisfied:

$$\frac{\Delta F}{F} = \frac{D}{2R}$$

Here $\Delta F/F$ is the relative bandwidth, whereas R is the object range and D is the antenna aperture. The upper part of the figure (22A) shows that spaced receiving antennas give transverse resolution, whereas the lower part (FIG. 22B) shows that spaced frequencies give resolution in depth.

Figure 23:
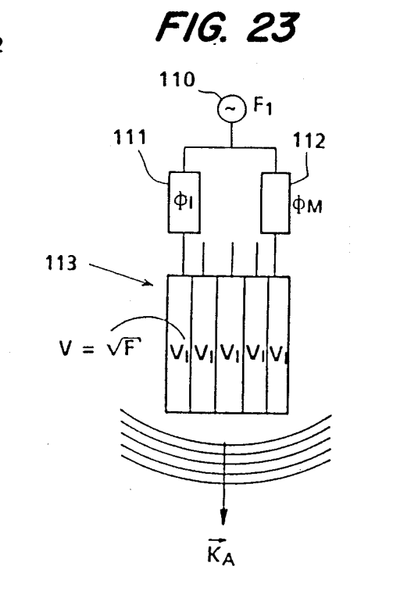
FIG. 23 shows a form of a coherent acoustic point source.

The fact that the acoustic sources shall be coherent, derived from a set of phase-locked sinusoidal generators and beam-shaped so as to appear as an array of point generators, makes it important to have transducers with a maximum of efficiency for coherent signals. This can be implemented with "matching circuits" as shown in FIG. 23. In this figure there is shown a sinus generator 110 energizing a number of resonant transducers 111-112 of high efficiency. Each of these transducers moreover is coupled to a matching unit in a group 113, in which there is effected matching to the acoustic propagation mediu, by a form of coupled circuits in analogy to that whihc is employed in microwave technology. Any desired phase front can thus be produced, in particular in order that the arrangement shall operate like a point source. In this manner a number of phase-controlled resonant transducer cavities will constitute the acoustic sources. This phase front matching by distributed source elements gives a good impedance matching and reduced cavitation. A design being advantageous in practice consists therein that the acoustic transducers in the form of tuned resonance elements 111-112 are coupled to an impedance matching network 113 in the form of quarter-wave transformers from an air column to the water mass or volume.

We claim:

1. A system for marine seismic exploration of underground structures beneath the sea bottom being covered by a mass of water having a water surface, comprising a transmitter means having an array of acoustic transducers for generating acoustic waves in the water, and a receiver means for detecting an acoustic wave pattern formed on the water surface by the acoustic waves reflected from said underground structures, wherein said acoustic transducers are mutually phase locked sine-wave generators producing a number of mutually coherent monochromatic acoustic waves of different frequencies, and wherein said receiver means comprises a continuous wave radar illuminating said acoustic wave pattern with monochromatic electromagnetic waves of at least one frequency adapted to be reflected by the acoustic wave pattern;

and wherein said continuous wave radar comprises narrowband receiver circuits tuned to at least one frequency corresponding to a frequency shift imparted to reflected electromagnetic waves in relation to said illuminating electromagnetic waves due to the Doppler effect caused by motion of said acoustic wave pattern along said water surface, said receiver means further comprising a processor unit adapted to determine phase and relative amplitudes of said reflected acoustic waves on the basis of said reflected, frequency-shifted electromagnetic waves, so as to thereby obtain a recording of said underground structures.

2. A system according to claim 1, wherein said acoustic transducers are arranged in a one-dimensional, two-dimensional or three-dimensional array adapted to generate harmonic, multifrequency signals.

3. A system according to claim 1, wherein said acoustic transducers are adapted to produce acoustic wave fields which are focused at a point beneath the said water surface so as to increase the energy density in strata of interest in said structures.

4. A system according to claim 1, wherein the operation of said acoustic transducers is synchronized with the operation of said radar system.

5. A system according to claim 1, wherein said radar system is adapted to operate at a plurality of frequencies which generate a large plurality of interference patterns with different wave numbers and having plane wave fronts.

6. A system according to claim 5, wherein said radar system has a number of apertures located side by side for generating wave number vectors of any direction.

7. A system according to claim 1, wherein an illuminated area is wide compared to the wave length of the acoustic interference patterns so as to obtain a focusing effect, and wherein a number of frequencies are used for matching to acoustic waves having phase centers directly beneath the radar position.

8. A system according to claim 7, wherein said radar system is provided with more than one aperture and operates with time varying frequencies for generating interference patterns corresponding to a focused acoustic wave, and wherein the phase center of the acoustic wave is adapted to have an arbitrary location in three dimensions with respect to the radar position.

9. A system according to any of claims 5, 6, 7, 8 wherein, on the basis of knowledge with respect to the frequency of the acoustic field and by using only one interference pattern, there is provided information about the scattering coefficients of a number of depth or structure strata simultaneously, taking into account the local incident angle and phase velocity of the acoustic waves and the requirements as to matching of wave numbers and velocity.

10. A system according to claim 9, wherein phase shifters are applied to all frequency components, so as to thereby give the interference patterns a migration corresponding to the possibly projected velocity of the acoustic fields.

11. A system according to claim 1, wherein said system operates in a self-learning mode, in which said radar system estimates the condition of the said water surface and selects frequencies of the acoustic interference field and the radar interferences field respectively, so as to provide a maximum contrast of the acoustic field against said water surface.

12. A system according to claim 11, wherein algorithms are implemented which enhance the surface or interference patterns of the acoustic fields in relation to the background constituted by the water surface, said algorithms including Doppler filtering and rigidity filtering.

13. A system according to claim 1, wherein said acoustic transducers are tuned resonant elements with impedance matching networks in the form of quarter-wave transformers from an air column to the water mass or volume.

14. A system according to claim 1, wherein said acoustic transducers are arranged on vessels having independent positions, and wherein radio navigation of high accuracy is employed in order to compensate for deviations from an ideal position in relation to the other transducers in the transducer array.

15. A system according to claim 1, wherein said transmitter means and receiver means are physically located at a distance from each other, said distance being large with respect to the wavelength of said acoustic waves.

* * * * *